United States Patent
Choi et al.

(10) Patent No.: US 8,406,493 B2
(45) Date of Patent: Mar. 26, 2013

(54) MULTI-GRAYSCALE OVERLAY WINDOW

(75) Inventors: J. Richard Choi, McLean, VA (US); Les R. Folio, Alexandria, VA (US)

(73) Assignee: The Henry M. Jackson Foundation for the Advancement of Military Medicine, Inc., Rockville, MD (US)

( * ) Notice: Subject to any disclaimer, the term of this patent is extended or adjusted under 35 U.S.C. 154(b) by 1049 days.

(21) Appl. No.: 12/175,308

(22) Filed: Jul. 17, 2008

(65) Prior Publication Data
US 2010/0014729 A1    Jan. 21, 2010

(51) Int. Cl.
*G06K 9/00* (2006.01)
(52) U.S. Cl. .................................................. 382/128
(58) Field of Classification Search .................. 382/128
See application file for complete search history.

(56) References Cited

U.S. PATENT DOCUMENTS

| | | | | |
|---|---|---|---|---|
| 4,852,002 A | * | 7/1989 | Klausz | 382/274 |
| 5,042,077 A | * | 8/1991 | Burke | 382/169 |
| 5,900,732 A | * | 5/1999 | Felmlee et al. | 324/309 |
| 6,901,130 B2 | | 5/2005 | Bruder et al. | |
| 6,993,171 B1 | | 1/2006 | Choi | |
| 7,110,616 B2 | * | 9/2006 | Ditt et al. | 382/284 |
| 7,366,335 B2 | | 4/2008 | Nagata et al. | |
| 2004/0047497 A1 | | 3/2004 | Daw et al. | |
| 2007/0242868 A1 | | 10/2007 | Stanton et al. | |
| 2010/0104160 A1 | * | 4/2010 | Lavi et al. | 382/131 |

OTHER PUBLICATIONS

Fayad, Laura et al. "Chest CT Window Settings with Multiscale Adaptive Histogram Equalization: Pilot Study." Radiology, 223: 845-852 (2002).
Lehr, James e al. "Body Computed Tomography—Histogram Equalization of CT Images." Radiology, 154: 163-169 (1985).
International Search Report and Written Opinion mailed on Sep. 23, 2009 for corresponding International Patent Application No. PCT/US2009/050386 filed Jul. 13, 2009 (12 pages).

* cited by examiner

*Primary Examiner* — Rodney Fuller
(74) *Attorney, Agent, or Firm* — Wilmer Cutler Pickering Hale & Dorr LLP.

(57) ABSTRACT

A method is provided for separating diagnostic content of x-ray images from non-diagnostic content in order to achieve an optimum image reproduction and windowing. In particular, a method is provided for displaying a plurality of radiological density images in a single viewing window by overlaying gray scale images of each radiological density image in a single display window.

43 Claims, 5 Drawing Sheets

MULTI-GRAYSCALE OVERLAY WINDOW

FIELD OF THE INVENTION

The present invention generally relates to radiological diagnostic imaging and image reconstruction, more particularly, is concerned with methods for overlaying multi-gray scale viewing windows.

BACKGROUND OF THE INVENTION

Computed tomography (CT), also referred to as computed axial tomography (CAT) or body section roentgenography, is a medical imaging method employing tomography. CT imaging provides diagnostic images of a medical patient for subsequent review by a radiologist or other health care provider. CT images are constructed based on relative radiological densities of the internal organs and tissues obtained from CT scanning. Radiological densities from CT scanning may be expressed in Hounsfield Units (HU). A Hounsfield unit (HU), also referred to as CT number, is a unit used to describe the amount of x-ray attenuation of each "voxel" (volume element) in a three-dimensional image. Voxels are generally represented as 12-bit binary numbers, and therefore have $2^{12}=4096$ possible values. These values are arranged on a scale from −1024 HU to +3071 HU, calibrated so that −1024 HU is the attenuation produced by air and 0 HU is the attenuation produced by water. Tissue and bone produce attenuations in the positive range.

Pixels in an image obtained by CT scanning are displayed in terms of relative radiodensity. The intensity of a pixel is expressed within a given range between a minimum and a maximum, inclusive. This range may be represented as a range from 0 (total absence, black) and 1 (total presence, white), with any fractional values in between. Another convention is to use a percentage scale from 0% to 100%. Grayscale images (e.g., photographs) intended for visual display on monitors or on printed media are commonly stored with 8 bits per pixel. This allows 256 different intensities (i.e., shades of gray) to be recorded, typically on a non-linear scale.

A full density spectrum in CT imaging may produce over 5000 distinct HU density values, and computed images must be able to incorporate over 5000 distinct shades of gray in order to accommodate the full density spectrum. The accuracy provided by 8 bits per pixel format is barely sufficient to display medical images. Uses in medical imaging often require more levels in order to make full use of the sensor accuracy (typically 10, 12 or 16 bits per pixel) and to guard against round-off errors in computations. For example, 16 bits per pixel provides 65,536 levels or shades of gray. File formats, such as a Tagged Image File Format (TIFF), Portable Network Graphics (PNG) and Digital Imaging and Communications in Medicine (DICOM) image file formats, support 16-bit grayscale natively. However, browsers and many imaging programs tend to ignore the low order 8 bits of each pixel.

Although it is preferable to display images with a different shade of gray for every HU density value, the human eye is unable to distinguish between 5000 shades of gray. CT images can be displayed using a process known as windowing. In windowing, a range of HU values are selected for display and all HU values within this range are spread over the available gray scale. For example, high HU values are displayed as white and low HU values as black.

To image an area of the body in which tissues have a similar density—for example, the mediastinum or abdomen—shades of gray can be distributed over a narrow range of HU values ("narrow window") centered over the average HU value of a particular structure to be evaluated. For example, to evaluate the abdomen in order to find subtle masses in the liver, one might use liver windows. Choosing 70 HU as an average HU value for liver, the shades of gray can be distributed over a narrow window or range. One could use 170 HU as the narrow window, with 85 HU above the 70 HU average value; 85 HU below it. Therefore the liver window would extend from −15 HU to +155 HU, and all shades of gray for the image would be distributed in this range of Hounsfield values. Any HU value below −15 would be pure black, and any HU value above 155 HU would be pure white in this example. Similarly, bone windows would use a "wide window" (to evaluate everything from fat-containing medullary bone that contains the marrow, to the dense cortical bone), and the center or level would be a value in the hundreds of Hounsfield units.

With advances in high digital resolution imaging techniques, parameters for windowing images with 14 bits per pixel (16384 gray levels) are becoming even more important. If the windowing is too narrow or if the optimum level is not selected, image content disappears. If windowing is too wide, the image contrast is too low and details are more difficult to distinguish. Further, inspection and examination of organs and soft tissues may require plurality of viewing windows, each with different upper and lower displayable threshold values. Adjustment of these display windows for the variety of CT images involves considerable user interaction. Since multiple viewing windows must be established for each CT scan slice, radiological diagnoses which involve examination of plurality of internal organs are difficult and time consuming.

Consequently, a need exists for improvements in digital medical imaging techniques. In particular, there remains a need for an improved system and method for displaying a plurality of radiological density images in a single viewing window.

SUMMARY OF THE INVENTION

Embodiments of the present invention provide a method for separating diagnostic content of x-ray images from non-diagnostic content in order to achieve an optimum image reproduction and windowing. In particular, embodiments of the present invention provide a method for displaying a plurality of radiological density images in a single viewing window by overlaying gray scale images of each radiological density image in a single display window. Embodiments of the present invention also provide a method for processing computed tomographic images to reproduce tissue, lungs, and bone areas of a chest tomographic image with appropriate contrast for the three areas in one image, and to provide a computer-readable recording medium storing a program to cause a computer to execute the tomographic image processing method.

In accordance with an exemplary embodiment of the invention, a method is provided for generating a radiological scan image corresponding to a predetermined anatomical region. The radiological scan image having a plurality of pixels, each of the pixels associated with at least one radiological density value of a plurality of radiological density values. The method includes identifying a plurality of subsets of pixels associated with the plurality of radiological density values, each subset of pixels corresponding to at least one portion of a plurality of portions of the predetermined anatomical region. A plurality of radiological scan gray scale images are generated, including the plurality of subsets of pixels, each radiological scan gray scale image including at least one subset of pixels corresponding to the at least one portion of the predetermined anatomical region. The plurality of radiological scan gray scale images is overlaid to generate the radiological scan image.

A gray scale value is assigned to each pixel associated with the at least one subset of pixels. Each gray scale value is proportional to the radiological density value associated with each pixel, and each radiological density value is between a first threshold and a second threshold. The first threshold may be a highest radiological density value associated with the subset of pixels, and the second threshold may be a lowest radiological density value associated with the subset of pixels.

In accordance with an aspect of the invention, the gray scale value proportional to the first threshold is white, and the gray scale value proportional to the second threshold is black. In certain embodiments, the radiological scan image is a computed tomography (CT) scan image and the plurality of radiological density values correspond to computed tomography (CT) density values. The CT density values may be in DICOM format.

In accordance with further aspects of the invention, the radiological scan image is a two-dimensional cross-section slice of the predetermined anatomical region. At least one portion of the predetermined anatomical region may be displayed in a soft tissue window, lung window, or bone window, for example.

According to a further exemplary embodiment of the invention, a method of generating a radiological scan image is provided including identifying a first subset of pixels associated with the plurality of radiological density values corresponding to a first portion of the predetermined anatomical region, having associated therewith a highest radiological density value and a lowest radiological density value. A first radiological scan image is generated including the first subset of pixels, each pixel of the first subset being assigned a gray scale value proportional to the radiological density value associated with the pixel of the first subset of pixels, and each radiological density value corresponding to the first portion being between the highest radiological density value and the lowest radiological density value associated with the first portion.

A second subset of pixels is identified that is associated with the plurality of radiological density values corresponding to a second portion of the predetermined anatomical region, having associated therewith a highest radiological density value and a lowest radiological density value. A second radiological scan image is generated and includes the second subset of pixels, each pixel of the second subset being assigned a gray scale value proportional to the radiological density value associated with the pixel of the second subset, and each radiological density value corresponding to the second portion being between the highest radiological density value and the lowest radiological density value associated with the second portion.

A third subset of pixels is identified that is associated with the plurality of radiological density values corresponding to a third portion of the predetermined anatomical region, having associated therewith a highest radiological density value and a lowest radiological density value. A third radiological scan image is generated including the third subset of pixels, each pixel of the third subset being assigned a gray scale value proportional to the radiological density value associated with the pixel, and each radiological density value corresponding to the third portion being between the highest radiological density value and the lowest radiological density value associated with the third portion. At least two of the first image, the second image and the third image are overlaid to generate the radiological scan image corresponding to the predetermined anatomical region.

In further accordance with an aspect of the invention, a fourth subset of pixels is identified that is associated with the plurality of radiological density values corresponding to a fourth portion of the predetermined anatomical region. A fourth radiological scan image including the fourth subset of pixels is generated, each pixel of the fourth subset being assigned a gray scale value proportional to the radiological density value associated with the pixel, and each radiological density value corresponding to the fourth portion being between the highest radiological density value and the lowest radiological density value associated with the fourth portion. The fourth image may be overlaid with the at least two of the first image, the second image and the third image.

According to a further exemplary embodiment of the invention, a method of generating a radiological scan image corresponding to a predetermined anatomical region is provided. A first image for displaying a first portion of the radiological scan image is identified. The first image comprises pixels associated with the plurality of radiological density values corresponding to the first portion of the radiological scan image. A second image for displaying a second portion of the radiological scan image is determined, the second image including pixels associated with the plurality of radiological density values corresponding to the second portion of the radiological scan image. A gray scale value is assigned to each pixel associated with the images. The pixels associated with each image have gray scale values between a first value and a second value, wherein each gray scale value is proportional to the radiological density value associated with the pixel, and each radiological density value is between a first threshold and a second threshold associated with each portion of the radiological scan image. The first image and the second image are overlaid to generate the radiological scan image.

A third image for displaying a third portion of the radiological scan image may be determined, wherein the third image comprises pixels associated with the plurality of radiological density values corresponding to the third portion of the radiological scan image. A gray scale value is assigned to each pixel associated with the third image, and the pixels associated with the third image have gray scale values between the first value and the second value, wherein each gray scale value is proportional to the radiological density value associated with the pixel, and each radiological density value is between a first threshold and a second threshold associated with third portion of the radiological scan image. The third image is overlaid to the first and second images.

In accordance with a further exemplary embodiment of the present invention, a method of generating a radiological scan image corresponding to a predetermined anatomical region is provided. In doing so, a first display window for displaying a first image is determined. The first image comprises pixels associated with a plurality of radiological density values from about −170 Hounsfield unit to about 230 Hounsfield unit. Gray scale values are assigned to each pixel associated with the first image, each gray scale value being proportional to the corresponding pixel's associated radiological density value, and each gray scale value of the first image being between a first threshold and a second threshold. A first gray scale image is generated using the first display window.

A second display window for displaying a second image is determined, the second image including pixels associated with a plurality of radiological density values from about −1024 Hounsfield unit to about 50 Hounsfield unit. Gray scale values are assigned to each pixel associated with the second image, each gray scale value of the second image is proportional to the corresponding pixel's associated radiological density value, and each gray scale value of the second image is between the first threshold and the second threshold. A second gray scale image is generated using the second display window.

A third display window for displaying a third image is determined. The third image including pixels associated with radiological density values from about −950 Hounsfield unit to about 1550 Hounsfield unit. Gray scale values are assigned to each pixel associated with the third image, and each gray scale value of the third image is proportional to the corresponding pixel's associated radiological density value. Each gray scale value of the third image is between the first threshold and the second threshold. A third gray scale image is generated using the third display window. The method further includes overlaying the first gray scale image, the second gray scale image and the third gray scale image using the first display window to generate the radiological scan image. In accordance with an aspect of the invention, the first threshold gray scale value is 0 and the second threshold gray scale value is 256. In accordance with another aspect, the first threshold gray scale value is 0 and the second threshold gray scale value is 1024. In accordance with a further aspect, the first threshold gray scale value is 0 and the second threshold gray scale value is 65536.

An additional exemplary embodiment of the invention provides a computer program product residing on a computer readable medium for generating a radiological scan image corresponding to a predetermined anatomical region. The radiological scan image has a plurality of pixels, each of the pixel associated with at least one radiological density value of a plurality of radiological density values. The computer program product includes instructions for causing a computer to enable a user to identify a first subset of pixels associated with the plurality of radiological density values corresponding to a first portion of the predetermined anatomical region, having associated therewith a highest radiological density value and a lowest radiological density value. A first radiological scan image is generated including the first subset of pixels, each pixel of the first subset being assigned a gray scale value proportional to the radiological density value associated with the pixel of the first subset of pixels, and each radiological density value corresponding to the first portion being between the highest radiological density value and the lowest radiological density value associated with the first portion.

A second subset of pixels is identified that is associated with the plurality of radiological density values corresponding to a second portion of the predetermined anatomical region, having associated therewith a highest radiological density value and a lowest radiological density value. A second radiological scan image is generated including the second subset of pixels, each pixel of the second subset being assigned a gray scale value proportional to the radiological density value associated with the pixel of the second subset, and each radiological density value corresponding to the second portion being between the highest radiological density value and the lowest radiological density value associated with the second portion.

A third subset of pixels is identified that is associated with the plurality of radiological density values corresponding to a third portion of the predetermined anatomical region, having associated therewith a highest radiological density value and a lowest radiological density value. A third radiological scan image is generated including the third subset of pixels, each pixel of the third subset being assigned a gray scale value proportional to the radiological density value associated with the pixel, and each radiological density value corresponding to the third portion being between the highest radiological density value and the lowest radiological density value associated with the third portion. The plurality of images is overlaid to generate the radiological scan image.

DETAILED DESCRIPTION

Figure 1:
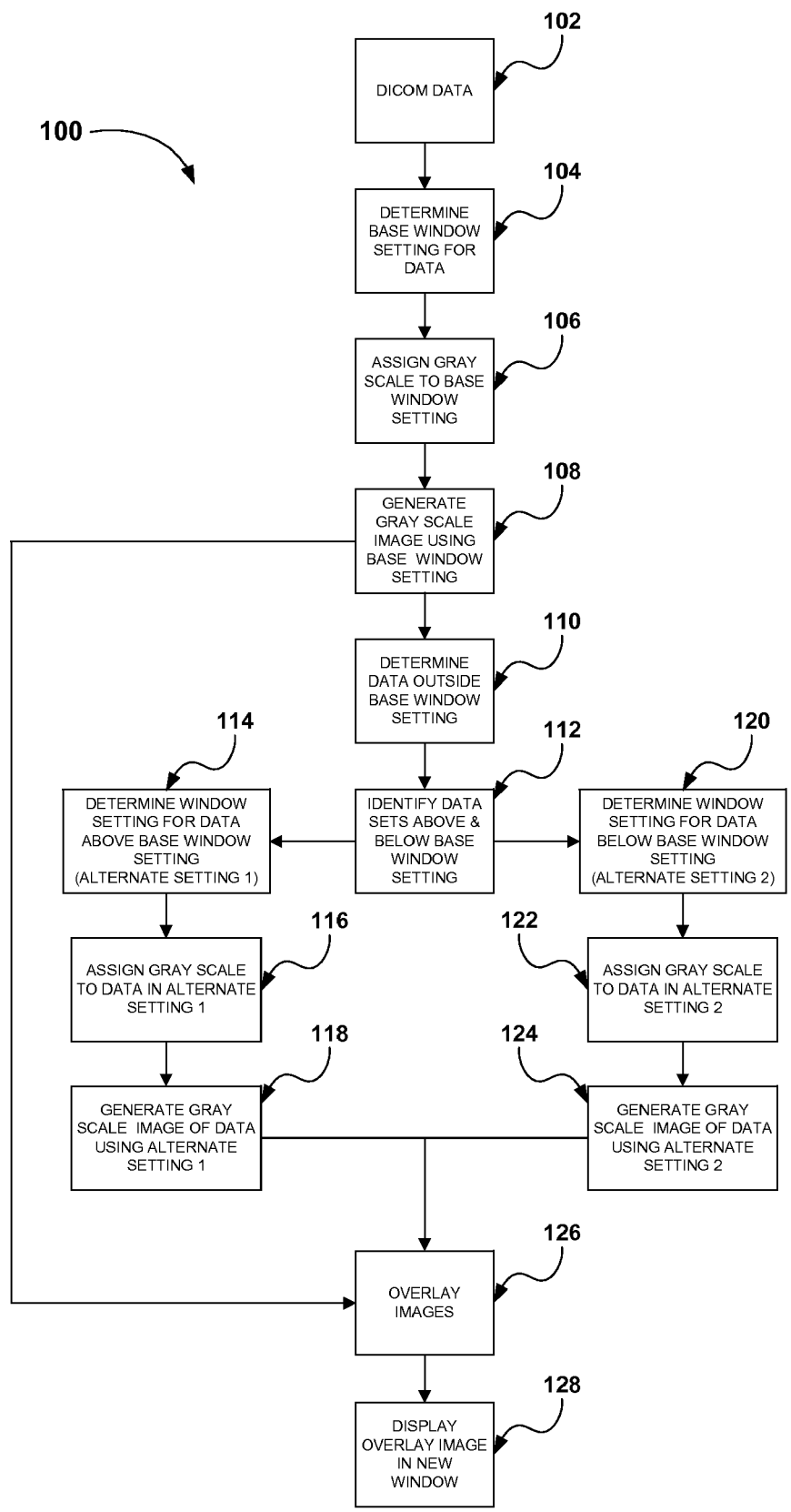
FIG. 1 is a flow diagram of an exemplary method for overlaying multiple gray scale CT images in a single viewing window in accordance with an aspect of the invention.

Referring now to the drawings, and more particularly, to FIG. 1, generally designated 100, there is shown a method for overlaying multiple gray scale radiological density images in a single viewing window. At step 102, radiological density data of an anatomical region are collected and a radiological density image is computed. The radiological density data of an anatomical region can include, for example, x-ray beam attenuations proportional to the densities of organs through which they travel. Exemplary anatomical regions may include back, thorax, abdomen, pelvis and perineum, head and neck, upper and lower extremities. Relative radiological densities of internal organs, tissues, bone, metal, phantom, and other objects may be obtained by CT scanning. CT scanning produces anatomical images by projecting x-ray beams through the desired portion of the human body. The x-ray beams undergo attenuation proportional to the densities of organs through which they travel. Detectors are arranged to receive the attenuated beams, and two-dimensional cross-section 'slices' are constructed based on relative radiological densities of the internal organs, tissues, bone, metal, phantom, and other objects.

CT images are divided into pixels, and each pixel corresponds to a radiological density value. Each pixel is displayed according to the mean attenuation of the tissues corresponding to a scale from −1024 to +3071 on the Hounsfield scale. For example, water has an attenuation of 0 Hounsfield units (HU) while air is −1000 HU, cancellous bone is typically +400 HU, cranial bone can reach 2000 HU or more and can cause artifacts. For example, artifacts are caused by abrupt transitions between low- and high-density materials, which result in data values that exceed the dynamic range of the processing electronics. Attenuation of metallic implants depends on atomic number of the element. For example, titanium usually has an amount of +1000 HU, and stainless steel can completely extinguish the X-ray and is responsible for line-artifacts in computed tomograms.

At step 104, a base display window setting is determined to display the radiological density image from step 102. A range of HU values between an upper limit of HU value and a lower limit of HU value, corresponding to a particular region to be evaluated, is determined. Display of a radiological density image is usually achieved by linearly mapping the image values through a display window, which is determined by window width and center values. At step 104, a HU value of the range of HU values is set as a base display window center. In one embodiment, an average of the range of HU values is set as the base display window center. Width of the base display window can be set from an upper limit setting to a lower limit setting that is centered over the base display window center. For example, for evaluating a thoracic region, a tissue window setting of 400/30 may be applied. This means that the display window width is 400 HU centered at a Hounsfield unit of 30, and displays tissues that have Hounsfield units between −170 to 230 HU. In some examples, for evaluating a head CT, a brain window setting of 80/40 may be applied as a base setting with a lung window setting of 1500/−700 as a low alternate and a bone window setting of 2500/350 as a high alternate. In other examples, for evaluating chest, abdomen, pelvis or extremities CTs, a soft tissue window setting of 400/30 may be applied as a base setting with a lung window as a low alternate setting and a bone window as a high alternate setting.

At step 106, each pixel of the radiological density image is assigned a gray scale value that is proportional to the pixel's corresponding HU value. Pixels corresponding to the highest HU value, in the range determined at step 104, are displayed as white and pixels corresponding to the lowest HU value in the range are displayed as black. Remaining pixels corresponding to HU values within the range are assigned shades of gray between white and black. Shades of gray distributed over the range of HU values are dependent on image pixels storage format. For example, images stored with 8 bits per pixel format may distribute 256 shades of gray over the range of HU values, images stored with 10 bits per pixel format may distribute 1024 shades of gray over the range, images stored with 12 bits per pixel format may distribute 4,096 shades of gray over the range, images stored with 14 bits per pixel may distribute 16,384 shades of gray over the range, and images stored with 16 bits per pixel format may distribute 65,536 shades of gray over the range of HU values.

Figure 2:
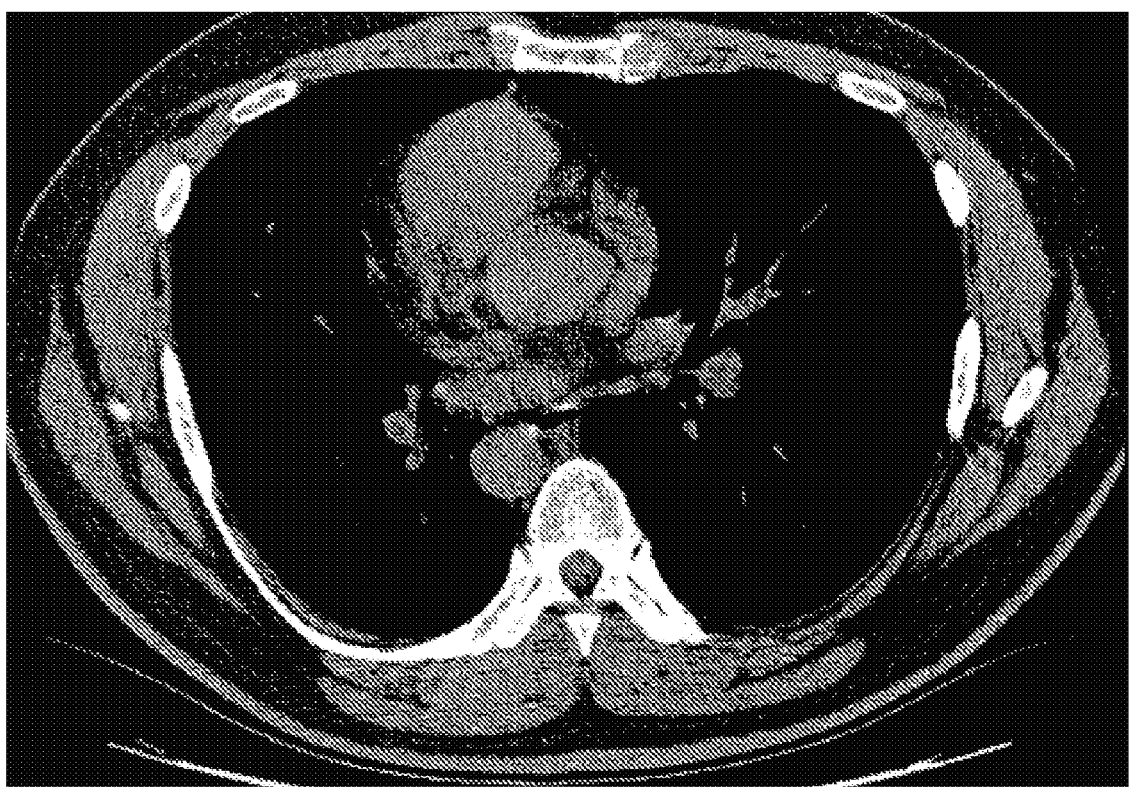
FIG. 2 shows an exemplary tissue window displaying a CT image of a thoracic region.

At step 108, a radiological density image corresponding to the range of HU values identified at step 104 is displayed using the base display window setting from step 104 and the gray scale assigned to each pixel at step 106. Display of gray scale assigned to each image pixel depends on image pixels format and the type of display device. For example, a 12-bit radiological density image will display on a common 8-bit computer monitor with 256 different shades of gray. FIG. 2 shows an exemplary tissue window, with a window setting of 400/30, displaying a gray scale image of tissues in a thoracic region. In the tissue window of FIG. 2, anything above the value of 230 HU is displayed as white and anything below −170 HU is displayed as black.

At step 110, radiological density data outside the base display window setting are identified. This includes HU values corresponding to the particular region being evaluated, but not included within the range of HU values selected at step 104. At step 112, at least two sets of HU values are identified from radiological density data determined at step 110. At least one set of HU values identified at step 112 is above the upper HU limit identified at step 104, and at least another set of HU values identified at step 112 is below the lower HU limit identified at step 104. In one embodiment, the set of HU values above the upper HU limit are associated with pixels displayed as white in the base display window. In another embodiment of the present invention, the set of HU values below the lower HU limit are associated with pixels displayed as black in base display window.

Next, alternate display window settings are determined for each set of HU values identified at step 112. At step 114, a first alternate display window setting is determined for a set of HU values, identified at step 112, that is above the upper HU limit. At step 114, an average of the set of HU values is set as the first alternate display window center. Using the first alternate display window center, a window width is set that is centered over the set of HU values. Width of the first alternate display window is set from an upper limit setting to a lower limit setting that is centered over the window center. For example, in FIG. 2, a bone window setting of 2500/300 is applied to display radiological density values between −950 HU to 1550 HU. In FIG. 2, radiological density values above 230 HU correspond to white pixels in the tissue window.

Figure 3:
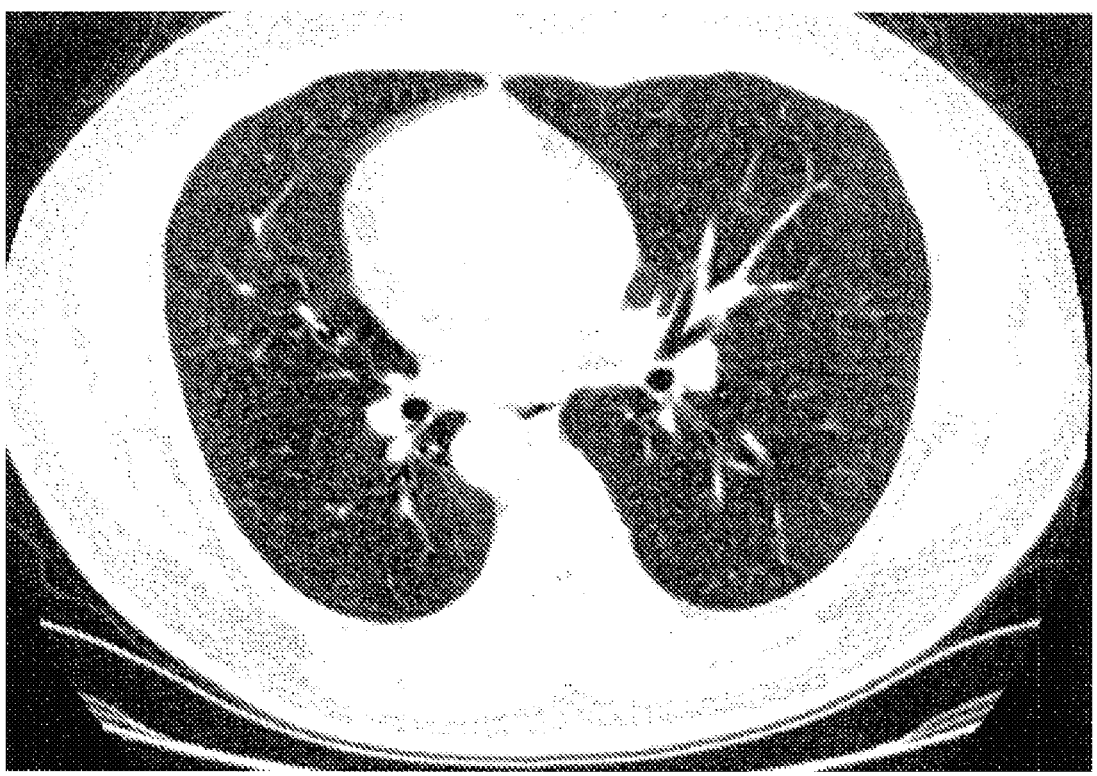
FIG. 3 shows an exemplary bone window displaying a CT image of a thoracic region.

At step 116, each pixel associated with each HU value from the set of HU values above the upper HU limit is assigned a gray scale value that is proportional to the pixel's corresponding HU value. Pixels corresponding to the highest HU value in the set determined at step 114 are displayed as white, and pixels corresponding to the lowest HU value in the set are displayed as black. Remaining pixels corresponding to HU values within the set determined at step 114 are assigned shades of gray between white and black. At step 118, a radiological density image corresponding to the range of HU values identified at step 112 is displayed using the first alternate window setting from step 114 and the gray scale assigned to each pixel at step 116. FIG. 3 shows an exemplary bone window with a window setting of 2500/300 displaying a gray scale image of the same thoracic region shown in FIG. 2.

At step 120, a second alternate display window setting is determined for a set of HU values, identified at step 112, that is below the lower HU limit identified at step 104. At step 120, an average of the set of HU values is set as the second alternate display window center. Using the second alternate display window center, a window width is set that is centered over the set of HU values. Width of the second alternate display window is set from an upper limit setting to a lower limit setting that is centered over the window center. For example, in FIG. 2, a lung window setting of 1500/−700 is applied to display radiological density values between −1450 HU to 50 HU. In FIG. 2, radiological density values below −170 HU correspond to black pixels in the tissue window. Because the lowest possible Hounsfield value is −1024, the window displays a range between −1024 HU to 50 HU.

Figure 4:
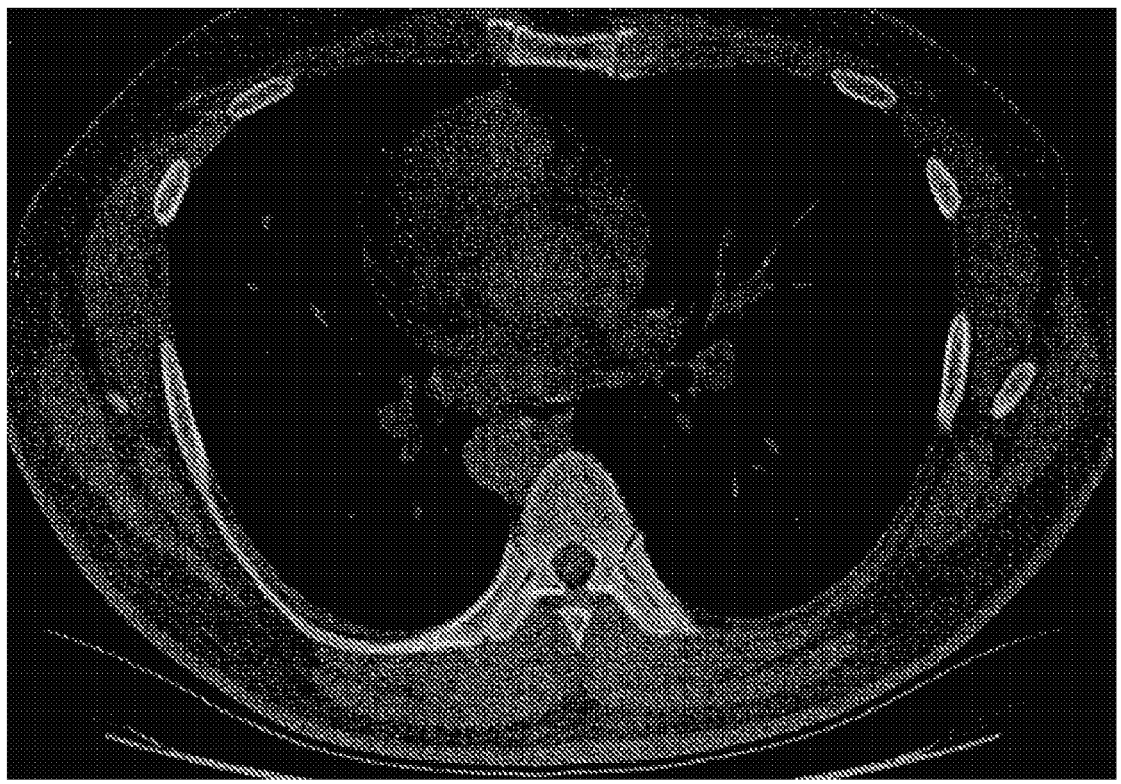
FIG. 4 shows an exemplary lung window displaying a CT image of a thoracic region.

At step 122, each pixel associated with each HU value from the set of HU values above the upper HU limit is assigned a gray scale value that is proportional to the pixel's corresponding HU value. Pixels corresponding to the highest HU value in the range determined at step 120 are displayed as white, and pixels corresponding to the lowest HU value in the set are displayed as black. Remaining pixels corresponding to HU values within the set determined at step 120 are assigned shades of gray between white and black. At step 124, a radiological density image, corresponding to the range of HU values identified at step 112 is displayed using the second alternate window setting from step 122 and the gray scale assigned to each pixel at step 120. FIG. 4 shows an exemplary lung window with a window setting of 1500/−700 displaying a gray scale image of the same thoracic region shown in FIG. 2.

At step 126, the images generated at steps 108, 118, and 124 are overlaid. An overlay image can be generated by assigning gray scale values, using either the first or the second alternate window settings, to pixels in the base window that are associated with sets of HU values identified at step 112. Pixels in the base display window, associated with HU values above the upper HU limit, are assigned their corresponding gray scale values determined at step 116. For example, pixels displayed as white in the base display window are assigned their corresponding gray scale value determined using the first alternate window setting. Pixels in the base display window, associated with HU values below the lower HU limit, are assigned their corresponding gray scale value determined at step 122. For example, pixels displayed as black in the base display window are assigned their corresponding gray scale values determined using the second alternate window setting. In one embodiment of the present invention, an overlay image can be generated by assigning gray scale values, using the first alternate window settings, to pixels in the base window that are associated with HU values above the upper HU limit. In another embodiment of the present invention, an overlay image can be generated by assigning gray scale values, using the second alternate window settings, to pixels in the base window that are associated with HU values below the lower HU limit. An overlay image can also be produced by superimposition of the images, and then by co-adding (stacking) pixel by pixel. The possibility also exists for adding several (i.e. more than three) images of the aforesaid type, and performing further image processing steps.

Overlaying of images at step 126 may further include an edge correction process for enhancing the edges of the overlaid image. Edge correction may be performed by first identifying edge pixels in the base display window. Edge pixels correspond to pixels in the base display window that are adjacent to pixels whose gray scale values have been changed to either gray scale values determined at step 116 or gray scale values determined at step 122. Between each edge pixel in the base display window and its adjacent pixels whose gray scale values have been changed, an edge indicator can be placed to indicate a window boundary. For example, colored lines may be placed as edge indicators to outline the change in window display settings.

Figure 5:
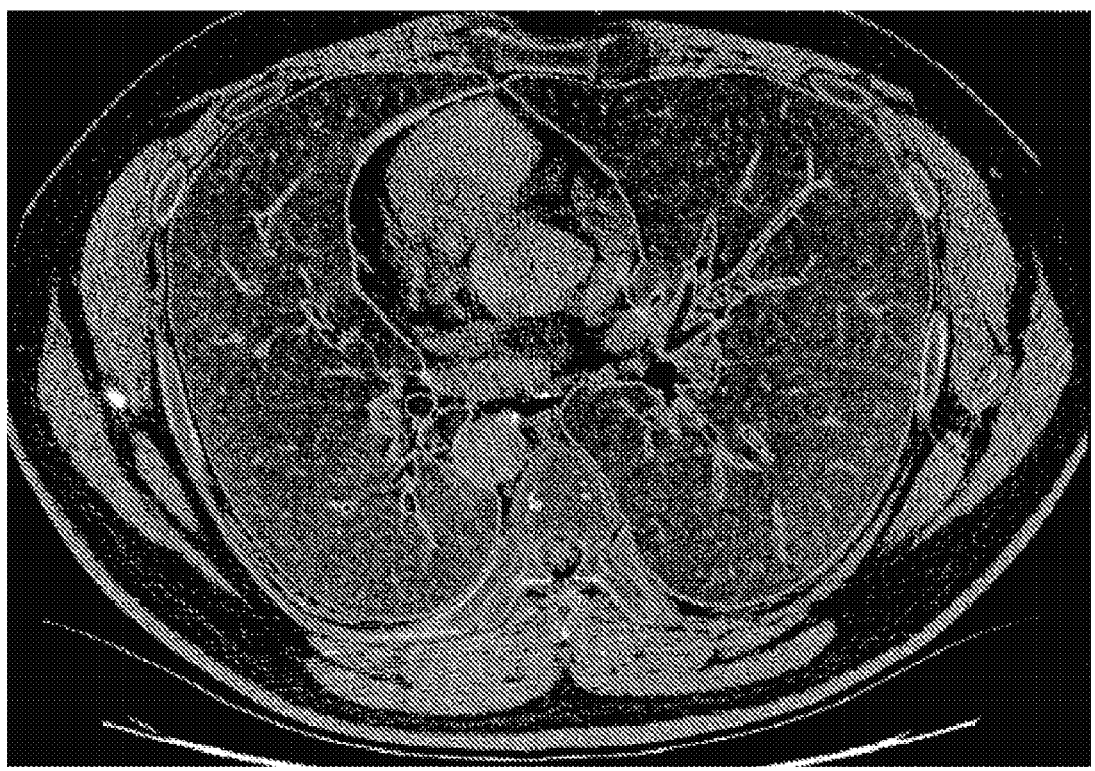
FIG. 5 shows an exemplary multi-gray scale overlay window displaying overlaid images of tissues, lungs and bones constructed in accordance with an aspect of the present invention.

At step 128, the overlaid image from step 126 is displayed in a new display window using the base display setting determined at step 104. FIG. 5 shows exemplary images of tissues, lungs and bones overlaid over each other and displayed in a new window constructed in accordance with an exemplary method of the present invention.

Exemplary embodiments of the invention thus offer an aspect of overlaying multi-gray scale images to generate an overlay image whose image quality is greatly improved, and which permits more accurate evaluation of the resulting overlay image. The multi-gray scale overlay method of the present invention and many of its attendant advantages will be understood from the foregoing description and it will be apparent that various changes may be made without departing from the spirit and scope of the invention or sacrificing material aspects, the forms hereinbefore described being merely exemplary embodiments thereof.

We claim:

1. A method of generating a radiological scan image corresponding to a predetermined anatomical region, the radiological scan image having a plurality of pixels, each of the pixels associated with at least one radiological density value of a plurality of radiological density values obtained from a single radiological scan, the method comprising:
    identifying a plurality of subsets of pixels associated with the plurality of radiological density values obtained from the single radiological scan, each subset of pixels corresponding to at least one portion of a plurality of portions of the predetermined anatomical region;
    generating a plurality of radiological scan gray scale images comprising the plurality of subsets of pixels, each radiological scan gray scale image comprising at least one subset of pixels corresponding to the at least one portion of the predetermined anatomical region; and
    overlaying the plurality of radiological scan gray scale images to generate the radiological scan image.

2. The method of claim 1, further comprising assigning a gray scale value to each pixel associated with the at least one subset of pixels, wherein each gray scale value is proportional to the radiological density value associated with each pixel, and each radiological density value is between a first threshold and a second threshold.

3. The method of claim 2, wherein the first threshold is a highest radiological density value associated with the subset of pixels, and wherein the second threshold is a lowest radiological density value associated with the subset of pixels.

4. The method of claim 2, wherein the gray scale value proportional to the first threshold is white and the gray scale value proportional to the second threshold is black.

5. The method of claim 1, wherein the radiological scan image is a computed tomography (CT) scan image.

6. The method of claim 1, wherein the plurality of radiological density values correspond to computed tomography (CT) density values.

7. The method of claim 6, wherein the CT density values are in DICOM format.

8. The method of claim 1, wherein the radiological scan image is a two-dimensional cross-section slice of the predetermined anatomical region.

9. The method of claim 1, wherein the at least one portion of the predetermined anatomical region is displayed in a soft tissue window.

10. The method of claim 1, wherein the at least one portion of the predetermined anatomical region is displayed in a lung window.

11. The method of claim 1, wherein the at least one portion of the predetermined anatomical region is displayed in a bone window.

12. The method of claim 1, wherein the plurality of radiological gray scale images are generated from the single radiological scan.

13. A method of generating a radiological scan image corresponding to a predetermined anatomical region, the radiological scan image having a plurality of pixels, each of the pixels associated with at least one radiological density value of a plurality of radiological density values obtained from a single radiological scan, the method comprising:
    identifying a first subset of pixels associated with the plurality of radiological density values obtained from the single radiological scan corresponding to a first portion of the predetermined anatomical region, having associated therewith a highest radiological density value and a lowest radiological density value;
    generating a first radiological scan image comprising the first subset of pixels, each pixel of the first subset being assigned a gray scale value proportional to the radiological density value associated with the pixel of the first subset of pixels, and each radiological density value corresponding to the first portion being between the highest radiological density value and the lowest radiological density value associated with the first portion;
    identifying a second subset of pixels associated with the plurality of radiological density values obtained from the single radiological scan corresponding to a second portion of the predetermined anatomical region, having associated therewith a highest radiological density value and a lowest radiological density value;
    generating a second radiological scan image comprising the second subset of pixels, each pixel of the second subset being assigned a gray scale value proportional to the radiological density value associated with the pixel of the second subset, and each radiological density value corresponding to the second portion being between the highest radiological density value and the lowest radiological density value associated with the second portion;

identifying a third subset of pixels associated with the plurality of radiological density values obtained from the single radiological scan corresponding to a third portion of the predetermined anatomical region, having associated therewith a highest radiological density value and a lowest radiological density value;

generating a third radiological scan image comprising the third subset of pixels, each pixel of the third subset being assigned a gray scale value proportional to the radiological density value associated with the pixel, and each radiological density value corresponding to the third portion being between the highest radiological density value and the lowest radiological density value associated with the third portion; and overlaying at least two of the first image, the second image and the third image to generate the radiological scan image corresponding to the predetermined anatomical region.

14. The method of claim 13, further comprising:
identifying a fourth subset of pixels associated with the plurality of radiological density values obtained from the single radiological scan corresponding to a fourth portion of the predetermined anatomical region;

generating a fourth radiological scan image comprising the fourth subset of pixels, each pixel of the fourth subset being assigned a gray scale value proportional to the radiological density value associated with the pixel, and each radiological density value corresponding to the fourth portion being between the highest radiological density value and the lowest radiological density value associated with the fourth portion; and overlaying the fourth image with the at least two of the first image, the second image and the third image.

15. The method of claim 14, wherein the first, second, third, and fourth radiological scan images are generated from the single radiological scan.

16. The method of claim 13, wherein overlaying the images comprises overlaying the first image, the second image and the third image.

17. The method of claim 13, wherein the gray scale value proportional to the highest radiological density value is white and the gray scale value proportional to the lowest radiological density value is black.

18. The method of claim 13, wherein the radiological scan image is a CT scan image.

19. The method of claim 13, wherein the plurality of radiological density values correspond to CT density values.

20. The method of claim 19, wherein the CT density values are in DICOM format.

21. The method of claim 13, wherein the predetermined anatomical region is a two-dimensional cross-section slice of a predetermined region of a human body.

22. The method of claim 13, wherein the predetermined anatomical region is a two-dimensional cross-section slice of a thoracic region.

23. The method of claim 13, wherein the first portion of the predetermined anatomical region is displayed in a soft tissue window.

24. The method of claim 13, wherein the second portion of the predetermined anatomical region is displayed in a lung window.

25. The method of claim 13, wherein the third portion of the predetermined anatomical region is displayed in a bone window.

26. The method of claim 13, wherein the first, second, and third radiological scan images are generated from the single radiological scan.

27. A method of generating a radiological scan image corresponding to a predetermined anatomical region, the radiological scan image having a plurality of pixels, each of the pixels associated with at least one radiological density value of a plurality of radiological density values obtained from a single radiological scan, the method comprising:

identifying a first image for displaying a first portion of the radiological scan image, wherein the first image comprises pixels associated with the plurality of radiological density values obtained from the single radiological scan corresponding to the first portion of the radiological scan image;

determining a second image for displaying a second portion of the radiological scan image, the second image comprising pixels associated with the plurality of radiological density values obtained from the single radiological scan corresponding to the second portion of the radiological scan image;

assigning a gray scale value to each pixel associated with the images, the pixels associated with each image having gray scale values between a first value and a second value, wherein each gray scale value is proportional to the radiological density value associated with the pixel, and each radiological density value is between a first threshold and a second threshold associated with each portion of the radiological scan image; and overlaying the first image and the second image to generate the radiological scan image.

28. The method of claim 27, further comprising:
determining a third image for displaying a third portion of the radiological scan image, wherein the third image comprises pixels associated with the plurality of radiological density values obtained from the single radiological scan corresponding to the third portion of the radiological scan image;

assigning a gray scale value to each pixel associated with the third image, the pixels associated with the third image having gray scale values between the first value and the second value, wherein each gray scale value is proportional to the radiological density value associated with the pixel, and each radiological density value is between a first threshold and a second threshold associated with third portion of the radiological scan image; and overlaying the third image to the overlaid first and second images.

29. The method of claim 28, wherein the third portion of the radiological scan image is a bone window.

30. The method of claim 28, wherein the first, second, and third images are generated from the single radiological scan.

31. The method of claim 27, wherein the first portion of the radiological scan image is a soft tissue window.

32. The method of claim 27, wherein the second portion of the radiological scan image is a lung window.

33. The method of claim 27, wherein the first gray scale value is white and the second gray scale value is black.

34. The method of claim 27, wherein the first and second images are generated from the single radiological scan.

35. A method of generating a radiological scan image corresponding to a predetermined anatomical region, the radiological scan image having a plurality of pixels, each of the pixels associated with at least one radiological density value of a plurality of radiological density values obtained from a single radiological scan, the method comprising:

determining a first display window for displaying a first image, wherein the first image comprises pixels associated with a plurality of radiological density values obtained from the single radiological scan from about −170 Hounsfield unit to about 230 Hounsfield unit;

assigning gray scale values to each pixel associated with the first image, each gray scale value being proportional to the corresponding pixel's associated radiological density value, and each gray scale value of the first image being between a first threshold and a second threshold;

generating a first gray scale image using the first display window;

determining a second display window for displaying a second image, the second image comprising pixels associated with a plurality of radiological density values obtained from the single radiological scan from about −1024 Hounsfield unit to about 50 Hounsfield unit;

assigning gray scale values to each pixel associated with the second image, each gray scale value of the second image being proportional to the corresponding pixel's associated radiological density value, and each gray scale value of the second image being between the first threshold and the second threshold;

generating a second gray scale image using the second display window;

determining a third display window for displaying a third image, the third image comprising pixels associated with radiological density values obtained from the single radiological scan from about −950 Hounsfield unit to about 1550 Hounsfield unit;

assigning gray scale values to each pixel associated with the third image, each gray scale value of the third image being proportional to the corresponding pixel's associated radiological density value, and each gray scale value of the third image being between the first threshold and the second threshold;

generating a third gray scale image using the third display window; and overlaying the first gray scale image, the second gray scale image and the third gray scale image using the first display window to generate the radiological scan image.

36. The method of claim 35, wherein the first threshold gray scale value is 0 and the second threshold gray scale value is 256.

37. The method of claim 35, wherein the first threshold gray scale value is 0 and the second threshold gray scale value is 1024.

38. The method of claim 35, wherein the first threshold gray scale value is 0 and the second threshold gray scale value is 65536.

39. The method of claim 35, wherein the first gray scale image, the second gray scale image, and the third gray scale image are generated from the single radiological scan.

40. A computer program product residing on a non-transitory computer readable medium for generating a radiological scan image corresponding to a predetermined anatomical region, the radiological scan image having a plurality of pixels, each of the pixel associated with at least one radiological density value of a plurality of radiological density values obtained from a single radiological scan, the computer program product comprising instructions for causing a computer to enable a user to:

identify a first subset of pixels associated with the plurality of radiological density values obtained from the single radiological scan corresponding to a first portion of the predetermined anatomical region, having associated therewith a highest radiological density value and a lowest radiological density value;

generate a first radiological scan image comprising the first subset of pixels, each pixel of the first subset being assigned a gray scale value proportional to the radiological density value associated with the pixel of the first subset of pixels, and each radiological density value corresponding to the first portion being between the highest radiological density value and the lowest radiological density value associated with the first portion;

identify a second subset of pixels associated with the plurality of radiological density values obtained from the single radiological scan corresponding to a second portion of the predetermined anatomical region, having associated therewith a highest radiological density value and a lowest radiological density value;

generate a second radiological scan image comprising the second subset of pixels, each pixel of the second subset being assigned a gray scale value proportional to the radiological density value associated with the pixel of the second subset, and each radiological density value corresponding to the second portion being between the highest radiological density value and the lowest radiological density value associated with the second portion;

identify a third subset of pixels associated with the plurality of radiological density values obtained from the single radiological scan corresponding to a third portion of the predetermined anatomical region, having associated therewith a highest radiological density value and a lowest radiological density value;

generate a third radiological scan image comprising the third subset of pixels, each pixel of the third subset being assigned a gray scale value proportional to the radiological density value associated with the pixel, and each radiological density value corresponding to the third portion being between the highest radiological density value and the lowest radiological density value associated with the third portion; and overlay the plurality of images to generate the radiological scan image.

41. The method of claim 40, wherein the first portion, the second portion and the third portion respectively correspond to different ranges of the radiological density values.

42. The method of claim 40, wherein the first radiological scan image, the second radiological scan image, and the third radiological scan image are generated from the single radiological scan.

43. A method of generating a radiological scan image corresponding to a predetermined anatomical region, the radiological scan image having a plurality of pixels, each of the pixels associated with at least one radiological density value of a plurality of radiological density values obtained from a single radiological scan, the method comprising:

collecting radiological density data of the predetermined anatomical region in the single radiological scan;

determining the plurality of radiological density values from the radiological density data;

identifying a plurality of subsets of pixels associated with the plurality of radiological density values obtained from the single radiological scan, each subset of pixels corresponding to at least one portion of a plurality of portions of the predetermined anatomical region;

generating a plurality of radiological scan gray scale images comprising the plurality of subsets of pixels, each radiological scan gray scale image comprising at least one subset of pixels corresponding to the at least one portion of the predetermined anatomical region; and overlaying the plurality of radiological scan gray scale images to generate the radiological scan image.

* * * * *

UNITED STATES PATENT AND TRADEMARK OFFICE
CERTIFICATE OF CORRECTION

| | | |
|---|---|---|
| PATENT NO. | : 8,406,493 B2 | Page 1 of 1 |
| APPLICATION NO. | : 12/175308 | |
| DATED | : March 26, 2013 | |
| INVENTOR(S) | : Choi et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1161 days.

Signed and Sealed this
Thirtieth Day of December, 2014

Michelle K. Lee
*Deputy Director of the United States Patent and Trademark Office*